(12) United States Patent
Van Dyke et al.

(10) Patent No.: US 8,641,797 B2
(45) Date of Patent: Feb. 4, 2014

(54) METHOD FOR PRODUCING FULVIC ACID

(75) Inventors: Don Calvin Van Dyke, Orem, UT (US); Asa Staples Nielson, Orem, UT (US); Bruce Sutton, Provo, UT (US); Dan Davies, Fillmore, UT (US); Loyal B. Adams, Scipio, UT (US)

(73) Assignee: Black Dirt Organics Patent Management, Orem, UT (US)

( * ) Notice: Subject to any disclaimer, the term of this patent is extended or adjusted under 35 U.S.C. 154(b) by 0 days.

(21) Appl. No.: 13/536,788

(22) Filed: Jun. 28, 2012

(65) Prior Publication Data

US 2012/0279266 A1 Nov. 8, 2012

Related U.S. Application Data (63) Continuation-in-part of application No. 12/500,501, filed on Jul. 9, 2009, now abandoned.

(51) Int. Cl.
| C07D 319/00 | (2006.01) |
| C05F 11/08 | (2006.01) |
| C05F 17/00 | (2006.01) |
| C05F 3/00 | (2006.01) |
| C05F 3/04 | (2006.01) |
| C05F 11/00 | (2006.01) |

(52) U.S. Cl.
USPC ............ 71/9; 71/8; 71/10; 71/11; 71/12; 71/13; 71/14; 71/21; 71/23; 71/24; 71/25; 549/359

(58) Field of Classification Search
USPC ........ 549/359; 71/8, 9, 10, 11, 12, 13, 14, 21, 71/23, 24, 25
See application file for complete search history.

(56) References Cited

U.S. PATENT DOCUMENTS

| 3,076,291 A | | 2/1963 | Gardner |
| 3,111,404 A | | 11/1963 | Karcher et al. |
| 3,398,186 A | | 8/1968 | Schwartz |
| 3,544,296 A | | 12/1970 | Karcher |
| 3,674,649 A | * | 7/1972 | Formisano et al. ........... 435/142 |
| 3,761,237 A | * | 9/1973 | Jeffreys ........................... 71/9 |
| 3,770,411 A | | 11/1973 | Chambers et al. |
| 4,319,041 A | | 3/1982 | Goff |
| 4,459,149 A | | 7/1984 | Moran et al. |
| 5,004,831 A | | 4/1991 | Dekker et al. |

(Continued)

FOREIGN PATENT DOCUMENTS

| EP | 1097913 A1 | 5/2001 |
| EP | 1216976 A2 | 6/2002 |
| RU | 2409381 C1 | 1/2011 |

OTHER PUBLICATIONS

PCT/US2013/048721 International Search & Written Opinion, Oct. 2, 2013.

*Primary Examiner* — Wayne Langel
(74) *Attorney, Agent, or Firm* — Kunzler Law Group (57) ABSTRACT

The method of the present disclosure includes providing an organic compost material, combining the organic compost material with a crop to be grown, heating the organic compost material, combining the organic compost material with water, and extracting an aqueous liquid comprising humic acid and fulvic acid. The organic compost material may include straw and manure and the straw and manure may be subjected to several days and/or weeks of aerobic composting. The crop may include a variety of plants, trees, vegetables, fruits and fungi. In one embodiment, the crop may include mushroom spores, mycelia, or mushrooms.

19 Claims, 3 Drawing Sheets

(56) References Cited

U.S. PATENT DOCUMENTS

| | | |
|---|---|---|
| 5,248,814 A | 9/1993 | Calemma et al. |
| 5,670,345 A | 9/1997 | Srivastava et al. |
| 5,688,999 A | 11/1997 | Lebo, Jr. et al. |
| 5,854,032 A | 12/1998 | Srivastava et al. |
| 6,245,121 B1 | 6/2001 | Lamy et al. |
| 6,664,100 B2 | 12/2003 | Reverso |
| 6,695,892 B1 | 2/2004 | Fischer et al. |
| 7,825,266 B1 * | 11/2010 | McMahon .................... 549/359 |
| 7,896,944 B2 * | 3/2011 | Karr .................................. 71/9 |
| 8,383,840 B1 * | 2/2013 | McMahon .................... 549/359 |
| 2004/0261481 A1 * | 12/2004 | Anaya-Olvera ................. 71/24 |
| 2010/0010089 A1 | 1/2010 | Van Dyke et al. |
| 2011/0031188 A1 | 2/2011 | Perminova et al. |
| 2011/0237438 A1 * | 9/2011 | Marihart ...................... 504/358 |
| 2012/0047974 A1 * | 3/2012 | Huang et al. ........................ 71/8 |
| 2012/0090365 A1 * | 4/2012 | Ersek et al. ........................ 71/7 |

* cited by examiner

METHOD FOR PRODUCING FULVIC ACID

CROSS-REFERENCES TO RELATED APPLICATIONS

This is a continuation-in-part application of and claims priority to U.S. patent application Ser. No. 12/500,501 entitled "System and Method for production and use of Fulvic Acid" and filed on Jul. 9, 2009 for Don Calvin Van Dyke et al., which is incorporated herein by reference.

FIELD

This invention relates to liquid organic fertilizers and more particularly to fertilizers containing humic and fulvic acids.

BACKGROUND

Fulvic acid is a naturally-occurring organic product derived from humus, the organic material in soils produced by the decomposition of organic matter. In addition to fulvic acid, humus also contains humic acid and humin. These humic substances are active components in soil and provide numerous benefits for plants. Fulvic acid is the most plant-active of the humic substances. It is a plant growth stimulator that increases plant metabolism, nutrient intake, and improves root development.

Humic substances, including fulvic acid and humic acid, are largely found in pre-historic deposits of lignite, a soft, brownish coal that has developed from peat through bacterial action over millions of years. Smaller quantities are also found naturally in soil. Thus, while humic substances are naturally-occurring, extracting them from natural sources has proved to be complex and problematic. This is particularly true for extraction of fulvic acid from natural sources. For example, most traditional methods of extraction of fulvic acid in commercial quantities generally require extraction from lignite or coal, as is described in U.S. Pat. Nos. 4,788,360; 5,004,831; 5,248,814; 5,670,345; 5,854,032; and 6,695,892. Other known techniques involve extraction of humic substances from humic acid bearing mineral ores, such as U.S. Pat. No. 5,688,999. These methods generally require the use of acids and bases to leech out the desired components, and often involve many complex and energy intensive processes.

SUMMARY

From the foregoing discussion, it should be apparent that a need exists for an organic and natural extraction method for obtaining humic and fulvic acids. Beneficially such a method does not involve lignite or coal and does not require acids or bases to leech out the organic acids.

The inventors have observed that the known methods and systems for producing fulvic acid are complicated, expensive, inefficient, and harmful to the environment. It is thus desirable that fulvic acid and humic acid preparations be produced in a cheaper, faster, and easier process that is less harmful to the environment and from a more reliable source. The inventors have discovered that fulvic acid and humic acid compositions can be produced in this manner by extracting them from a source other than lignite and hardrock minerals.

The subject matter of the present disclosure relates to a method for extracting humic substances from an organic compost mixture by extracting a liquid component of the organic compost mixture. The liquid component may be extracted by collecting liquid percolating from the organic compost mixture, or by separating the liquid component from the solid components of the organic compost mixture. A liquid such as water that dissolves fulvic acid may be added to the organic compost mixture prior to extraction of the liquid component.

The liquid component in the organic compost mixture may be separated from the solid components by means of a separator, such as a centrifuge, belt press, filter press, or membrane press. The novel method and system may include optional additional steps, including filtration and treatment of the organic compost mixture and/or effluent, and may reuse the liquid effluent or solids byproduct to optimize the quantity of fulvic acid and humic acid extracted. The novel system and method is thus able to produce fulvic acid and humic acid without the need or use of acids.

The method may include providing an organic compost material, combining the organic compost material with a crop to be grown, heating the organic compost material, combining the organic compost material with water, and extracting an aqueous liquid comprising humic acid and fulvic acid. The organic compost material may include straw and manure and the straw and manure may be subjected to several days and/or weeks of aerobic composting. The crop may include a variety of plants, trees, vegetables, fruits and fungi. In one embodiment, the crop may include mushroom spores, mycelia, or mushrooms.

The organic compost material may be heated to at least 170° F. In another embodiment, the organic compost material may be heated to at least 200° F. In yet another embodiment, the organic compost material may be heated to at least 220° F. The organic compost material may be combined with water in a number of different ways. For example, the organic compost material may be formed into windrows and water may be sprayed or dispersed over the windrows. The subsequent run-off from the windrows may be collected and processed. In another embodiment, the water may percolate through the organic compost material and may be subsequently collected.

The amount of water added to the organic compost material may be a ratio of about 1:1 by weight. The water may be substantially natural water, un-processed and non-treated with a pH substantially at or around 7. The extraction of the aqueous liquid may include collecting as briefly describe above or may be by filtering, or concentrating. The aqueous liquid may also be processed by adding conditioning and or stabilizing components, such as deodorizers. In one example, essential oils may be added to the aqueous liquid to control the odor.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the disclosure.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
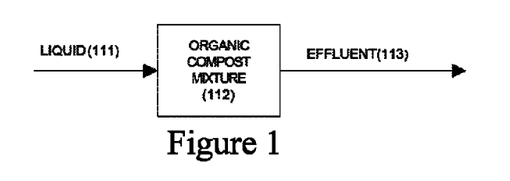
FIG. 1 is a schematic flow chart diagram of one embodiment of a method and system for producing an aqueous liquid containing humic acid and fulvic acid.

One embodiment of the novel system and method for producing humic substances, including fulvic acid, is shown in FIG. 1. In the depicted system and method, a liquid 111 is first combined with an organic compost material 112. After the liquid 111 has been combined with the organic compost material 112, the liquid component of the organic compost mixture is then extracted from the organic compost material 112. The resulting aqueous liquid effluent 113 contains, among other components, fulvic acid and humic acid.

The organic compost material 112 generally includes organic compost material, organic matter, or both. It may also include other components, such as water, liquids, and/or additives. Organic compost material is any product of microbial composting or microbial metabolism of organic matter (both generally referred to herein as "composting"). Such composting occurs when organic matter decays and decomposes, whether naturally or assisted with chemical or microbial additives, into organic compost material. Thus, the organic matter is a precursor to the organic compost material.

Any organic substance may be a suitable source of organic matter to generate the organic compost material. Examples of suitable organic matter for composting include, but are not limited to, human biosludge, human waste, animal waste, animal carcasses, tires, food, cellulosic materials, lignin, construction and demolition materials, plant matter, wood chips, straw, peat, cardboard, paper, coffee grounds, coir, cocoa shell, garden waste, leaves, grass, seaweed, manure, mushrooms, tree bark, eggshells, and the like. In one aspect of the novel system and method, the organic matter contains up to about 90% cellulose, such as grass, algae, cotton, wood pulp, wood chips, paper, cardboard, straw, and the like. One of the benefits of using cellulosic organic matter as a source material for production of humic substances instead of lignite is that the cellulose increases the quantity and production time of humic substances, and is a precursor to and preliminary component of fulvic acid.

The organic matter used in the novel system and process may produce organic compost material by either aerobic or anaerobic composting of the organic matter. Aerobically generated organic compost material is especially beneficial in the production and extraction of fulvic acid. One of the byproducts of aerobic composting is carbon dioxide, which is trapped in the organic compost material and therefore can become a part of the extracted aqueous liquid effluent 113. Anaerobic composting typically produces nitrogen and ammonia as byproducts, but the ammonia can be easily converted into ammonium nitrate, a common component of fertilizers, by those of skill in the art. Thus, the resulting aqueous liquid effluent 113 can contain not only humic substances, such as fulvic acid and humic acid, but also ammonium nitrate.

In another embodiment of the novel system and method, the organic compost material 112 comprises a compost windrow. A windrow is a long heap or pile of organic matter and/or organic compost material, often in a substantially triangular or mounded shape, for composting of the organic matter into organic compost material. While windrows may be of any shape or size, they are often hundreds of feet long and several feet tall. The size, shape, and contents of the windrow can be selected by those of skill according to the desired composting process parameters.

The liquid 111 combined with the organic compost material 112 can be any type of liquid in which fulvic acid can dissolve. In one embodiment, the liquid 111 is water, which dissolves fulvic acid and also provides moisture to the organic compost material 112 necessary for any microbes in the organic compost material 112 to carry out the composting process. However, the liquid 111 may be any liquid or solution capable of dissolving fulvic acid.

In one aspect, the liquid 111 combined with the organic compost material 112 is ionic water, which also aids in stabilizing and killing harmful pathogens in the organic compost material 112. In one embodiment, the water 111 is substantially neutral, non-processed, non-treated water. For example, the water 111 may be process water from an irrigation source or the like.

The water 111 and/or the aqueous liquid extract 113 may also include useful and beneficial components, such as molecules for the treatment of harmful pathogens, components to aid in the composting or extracting processes, or as additives as may be desired in the final effluent product. For example, in one embodiment essential oils may be added to the water 111 or added to the aqueous liquid 113 to deodorize the smell of the liquid or to otherwise mask the natural odor of the aqueous liquid by replacing it with another more pleasant/agreeable odor. For example, the oil extracted from *Lavandula angustifolia* ("Lavendar") has a floral/herbaceous smell that can mask the odor of the extracted aqueous liquid 113.

The liquid 111 can be added to the organic compost material 112 by various methods. In one embodiment, the liquid 111 is sprayed or applied to the surface of the organic compost material 112. This method is often used when the organic compost material 112 is a windrow. In another embodiment, the liquid 111 is added to the organic compost material 112 by mixing it with the organic compost material 112 in a mixer or other apparatus configured for mixing solids and liquids.

The liquid 111 can be added to the organic compost material 112 all at once, or at different times and intervals. The composting process usually requires some moisture content, so as the composting progresses the liquid 111 may need to be added periodically to ensure that the organic compost material 112 has the necessary moisture content. In another embodiment, the liquid 111 is added to the organic compost material 112 in a mixer or other conduit that mixes the two components.

The quantity of liquid 111 added to the organic compost material 112 can vary, and can be determined based on a number of different factors. In one aspect, the liquid 111 added to the organic compost material 112 will be determined by the composting process requirements. The amount of liquid 111 added can also vary depending on the moisture content found in the organic compost material 112. In one aspect, where water is used as the liquid 111, the ratio of water to organic compost material 112 is approximately one-to-one 1:1 by weight.

In another embodiment, the quantity of liquid 111 added is the amount necessary to saturate the organic compost material 112. In yet another embodiment, the amount of liquid 111 added to the organic compost mixture exceeds the saturation level of the organic compost material 112, thus resulting in excess or waste liquid runoff. The amount of liquid 111 to be added can vary depending on the desired amount of excess or waste runoff, as well as on the desired concentration of humic substances, including fulvic acid, in the resulting aqueous liquid effluent 113.

The liquid component (not shown) of the organic compost material 112 can be extracted in a number of different methods. In one embodiment, the liquid component is extracted by collecting the liquid component percolating through the organic compost material 112. The liquid component may percolate naturally through the organic compost material 112, such as by gravity. In another embodiment, percolation may be induced, such as be adjusting ambient pressure, temperature, or humidity. In another embodiment, percolation may be induced by adding liquid 111 to the organic compost material 112 in an amount that exceeds the saturation level of the organic compost material 112. When the organic compost material 112 is saturated, the liquid 111 added in excess of the saturation level cause excess liquid in the organic compost material 112 to percolate through and from the organic compost material 112.

The percolating aqueous liquid effluent 113 may then be collected by any means known to those of skill in the art, such as by allowing the aqueous liquid effluent 113 to flow or drip into or through a defined channel, collecting in a receiving tank, or by pumping. Indeed, any process or technique known to those of skill in the art can be employed to collect or gather effluent 113 from the organic compost material 112.

Figure 2:
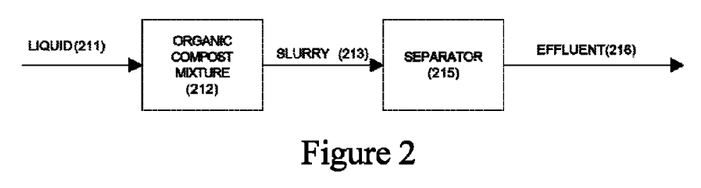
FIG. 2 is a schematic flow chart diagram of another embodiment of a method and system for producing an aqueous liquid containing humic acid and fulvic acid, the method and system including a slurry mixture and a separator.

In another embodiment, shown in FIG. 2, the liquid component of the organic compost mixture 212 is collected from a slurry 213 created by adding liquid 211 to organic compost mixture 212 according to the methods previously described. The slurry 213 is also an organic compost mixture. The liquid component is separated from the solid components by means of a separator 215. Suitable separators 215 generally include any type of apparatus capable of separating solids from liquids. Examples of a suitable separator 215 include, but are not limited to, a centrifuge, belt press, filter press, membrane press, or the like, or any combination of them. Once the slurry 213 is added into the separator 215, the separator 215 separates the solid components from the liquid component. The separated liquid component thus becomes the aqueous liquid effluent 216, which contains humic substances, including fulvic acid and humic acid.

In one embodiment, the separator 215 comprises a centrifuge. Typically, a stationary or continuous centrifuge will provide suitable separation of the liquid component from the solid components. Continuous centrifuges allow the continuous addition of slurry 213, the continuous removal of the liquid component, and the discontinuous, semicontinuous or continuous removal of the solid components. These types of centrifuges include, but are not limited to, tubular bowl centrifuges, continuous scroll centrifuges, and continuous multichamber disk-stack centrifuges. Semi-continuous centrifuges may also be used. Indeed, any type of centrifuge that allows the separation of solids from liquids may achieve the desired results. Other possible centrifuges include basket centrifuges, disk centrifuges, high speed centrifuges, industrial centrifuges, laboratory centrifuges, and ultracentrifuges.

In another embodiment of the novel method, the separator 215 comprises a belt press. A belt press is generally a dewatering device utilizing two opposing synthetic fabric belts, revolving over a series of rollers to squeeze liquid from the slurry 213. The belt press dewaters the slurry 213 by applying an increasing surface pressure to the slurry 213 as it passes between moving belts and/or a series of press rollers. While most belt press processes are intended to capture the solids while merely reusing or disposing of the waste liquid, in the novel process the liquid component drawn off from the slurry 213 by the belt press is captured as the desired effluent product 216. Any type of belt press that separates liquids from solids is suitable for the novel process.

In another embodiment, the separator 215 comprises a filter press. A filter press is beneficial for use with the novel method because it is a highly efficient, compact, dewatering device for separating solids from liquid slurries. In yet another embodiment, the separator 215 comprises a membrane press. Any type of filter press or membrane press that separates liquids from solids is suitable for the novel process. Indeed, any process or apparatus known to those of skill in the art for separating liquids from solids may be used in the novel process and system.

Regardless of the type of separator 215 used, the resulting aqueous liquid effluent 216 contains humic substances. Fulvic acid generally is the most abundant component of the aqueous liquid effluent 216. Other components of the effluent 216 include minerals, humates, fulvates, and salts formed during the organic composting process or the novel process described herein. Humates are mineral salts formed with humic acid, and fulvates are mineral salts formed with fulvic acid. Thus, in addition to fulvic acid and humic acid, the resulting effluent contains many minerals and nutrients beneficial to plant growth and health. As mentioned previously, the resulting effluent 216 may also contain ammonium nitrate and other byproducts of the composting process.

The novel system and process described herein may also be modified in many different aspects to produce the desired product. For example, in one embodiment of the novel system and method, shown in FIG. 3, the slurry 313 may optionally pass through a strainer or filter 314 to remove the larger particulate solids prior to entrance of the slurry 313 into the separator 315. This enhances the ability of the separator 315 to separate the solid components from the liquid component by removing the larger solid components prior to passing through the separator 315. Any type of strainer can be employed to affect this filtering process.

Figure 3:
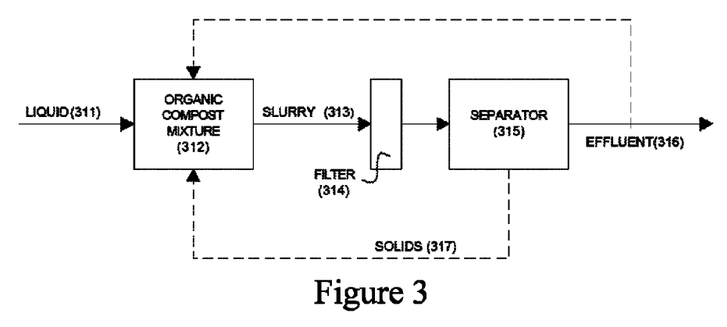
FIG. 3 is a schematic flow chart diagram of another embodiment of a method and system for producing an aqueous liquid containing humic acid and fulvic acid, the method and system including a slurry mixture, a filter, and a separator.

In another embodiment, also shown in FIG. 3, the concentration of fulvic acid in the resulting aqueous liquid effluent 316 can be optimized by reusing the aqueous liquid effluent 316 in the system and process. In this embodiment, after the slurry 313 has passed through the separator 315 and the liquid component separated from the solid components, the aqueous liquid effluent 316 drawn off the separator 315 is re-mixed with organic compost mixture 312 or slurry 313 for separation of the solid components from the liquid component in the organic compost mixture 312 or slurry 313 by means of the separator 315. The organic compost mixture 312 that is re-mixed with the effluent may be new or additional organic compost mixture, or may be the original organic compost mixture drawn off from the separator.

In one embodiment, the aqueous liquid effluent 316 is added to the organic compost mixture 312 to achieve approximately a 3:1 ratio by weight of aqueous liquid effluent 316 to solid components prior to the second separation step. This ratio may be adjusted as necessary to achieve optimum results. In one embodiment, this second separation step can be carried out on a second separator. The additional separation step may also be carried out on any number of sequential separators until the desired concentration and composition of the resulting aqueous liquid effluent 316 is achieved. By repeating the separation step in the process and reusing the aqueous liquid effluent 316, the resulting concentration of fulvic acid in the aqueous liquid effluent 316 can be doubled or increased many times more than would result with only one pass through a separator 315.

In another embodiment, also shown in FIG. 3, the solid components 317 separated from the liquid component by the separator 315 may also be used or reused in various applications. In one embodiment, the resulting solids 317 are again combined with liquid 311 to create a slurry 313 that is then run through a separator 315 to separate out the humic substances, including fulvic acid, that remained in the solids and did not separate with the liquid effluent 316 during the prior separation. The same procedures as described above for reuse of the effluent 316 can be employed on the separated solid components 317. Indeed, this process may be repeated on the solid components 317 multiple times in order to achieve a maximum or desired extraction of the humic substances, including fulvic acid.

Figure 4:
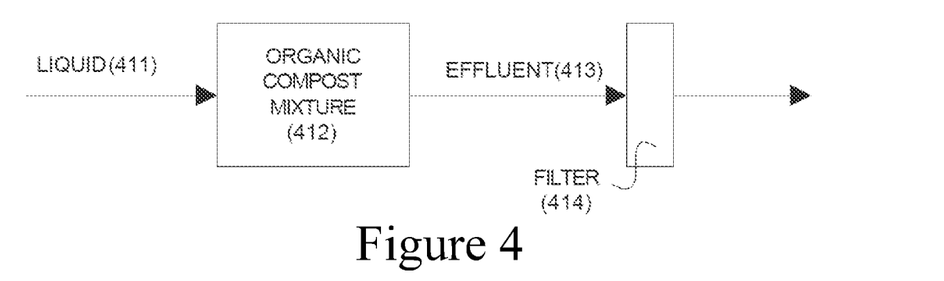
FIG. 4 is a schematic flow chart diagram of another embodiment of a method and system for producing an aqueous liquid containing humic acid and fulvic acid.

In another aspect of the novel system and method, once the effluent containing humic substances, including fulvic acid, has been collected from the organic compost mixture, it can then be prepared for use. For example, in one embodiment shown in FIG. 4, the effluent 413 is filtered or strained by a filter 414 prior to use to remove any remaining large solid components. In one embodiment, the filter 414 comprises a 50 micron filter. However, any size and number of filters 414 may be employed, depending on the desired level of filtration of the effluent 413.

In another embodiment, not shown in the figures, the system and process optionally includes a treatment step to kill pathogens in the effluent and stabilize the effluent for use. The organic compost mixture, slurry, and/or effluent may contain any number of harmful pathogens, particularly where the organic matter used includes manure and other blackwaste. The treatment carried out on the effluent may occur at any stage of the process, including prior to or after separation of the liquid and solid components, and prior to or after filtration of the effluent. Any process known to those of skill in the art can be used for treatment of the effluent.

In one embodiment, copper sulfate is added to the effluent as a treatment to kill pathogens and stabilize the effluent. In another embodiment, the effluent is treated by adding microbes selected for their capacity to kill harmful pathogens. In another embodiment, the treatment step comprises one or more heat processes to kill pathogens, including, but not limited to, pasteurization or thermophilic composting. These heat processes may occur during the composting process, or they may occur after collection of the effluent from the organic compost mixture, or both.

Figure 5:
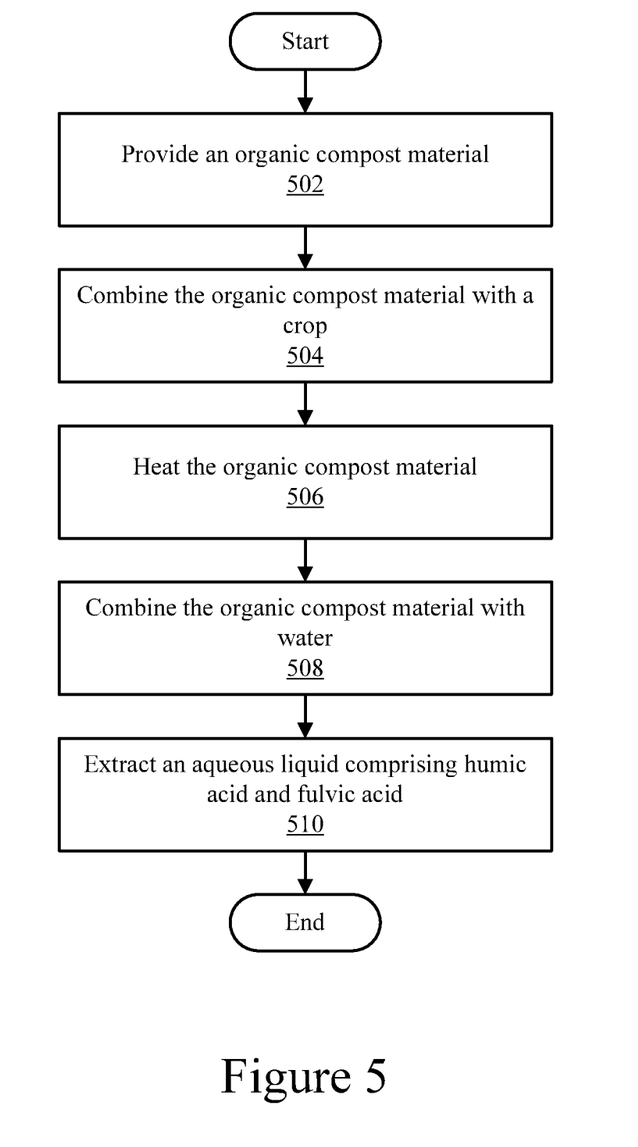
FIG. 5 is a schematic flow chart diagram of another embodiment of a method for producing an aqueous liquid containing humic acid and fulvic acid.

FIG. 5 is a schematic flow chart diagram of one embodiment of a method for producing an aqueous solution of fulvic acid and humic acid. The method includes providing 502 an organic compost material, combining 504 the organic compost material with a crop, heating 506 the organic compost material, 508 combining the organic compost material with water, and extracting 510 an aqueous liquid comprising fulvic acid and humic acid.

The provided 502 organic compost material, as described above with reference to FIG. 1, may include various organic materials, such as cellulosic materials, waste, manure, etc. In one embodiment, the organic compost material specifically includes wheat straw and a nitrogen source. The nitrogen source may be a fertilizer containing nitrogen or it may be manure, such as horse manure, chicken manure, turkey manure, etc. Also, providing 502 the organic compost material may include allowing the organic materials to aerobically compost for several weeks. In one embodiment, the aerobic composting process includes natural internal heating that raises the temperature of the organic compost material to at least 130° F.

In another embodiment, in order to facilitate the aerobic composting process, external heat may be applied to the organic compost material to raise the temperature of the compost material. The aerobic composting process may include multiple phases or steps of mixing the organic compost mixture in order to ensure proper oxygen interaction with the composting process.

The method continues by combining 504 the organic compost material with a crop. The crop may be any vegetable, fruit, tree, fungus, or plant that would benefit from the specific organic compost material. For example, mushrooms have a specific need for organic compost material because mushrooms (fungi in general) do not carry out the process of photosynthesis and thus all of their nutrients, energy, and food must be supplied to them via the soil they are growing in.

A crop may include crop starters, such as seeds, bulbs, spores, and the like. For example, mushrooms grow from mycelium, which grow from mushroom spores. Plants, such as vegetables, grow from seeds. Thus, a crop may include already planted crops that are already growing or crops may include crop starters such as seeds and spores. In one embodiment, combining 504 the organic compost material with a crop may include applying the compost to an already planted crop starter. For example, garden vegetables may be planted and then a layer of organic compost material may be added on top of the soil containing the vegetable seeds. In another embodiment, combining 504 the organic compost material with a crop may include applying to and/or mixing the organic compost material with the soil before the crop starters are planted. In yet another embodiment, the crop starters may be planted directly into the organic compost material or the crop starters, the soil, and the organic compost material may be all mixed together before planting.

The method continues by heating 506 the organic compost material. In one embodiment, the organic compost material is heated 506 while a portion of the crop is still growing. In another embodiment, the crop has been substantially harvested and the leftover/spent organic compost material is heated. In another embodiment, several rounds of crops have been planted in the same batch of organic compost material before the organic compost material is heated 506.

The heating 506 may be accomplished via any recognizable heating procedure. For example, steam-heating may be used to increase the ambient temperature around the organic compost material. In another embodiment, a heat exchanger may be used to substantially heat the organic compost material or a propane heater may be used to heat the organic compost material. The heating 506 may be inductive heating, convection heating, radiation heating, etc.

In one embodiment, the heating 506 causes the organic compost material to rise to a temperature in the range of between about 100° F. and 300° F. In another embodiment, the compost material rises to a temperature of between about 170° F. and 250° F. In another embodiment, the compost material rises to a temperature of about 200° F. In another embodiment, the heating 506 raises the organic compost material to a temperature of about 220° F.

The heating 506 step may benefit the organic compost material in several ways. For example, the heating 506 step may substantially sterilize, sanitize or pasteurize the organic compost material. In one embodiment where the organic compost material was combined with a mushroom crop, the heating 506 may substantially kill any remaining microbes or mushroom spores. The dead microbes/spores may result in a higher concentration of fulvic acid and humic acid in the organic compost mixture than would be present if the heating process were not applied. Spent compost generally includes dormant or dying microbes/spores, however, the heating process substantially kills the remaining microbes thus increases the yield, or at least the solubility/extractability, of the organic acids (humic and fulvic). In one embodiment, the unique growth process of mycelia/mushrooms (no photosynthesis) may contribute to the increased fulvic acid and humic acid content in the spent organic compost material, regardless of whether heating was applied or not.

In another embodiment, the heating 506 may beneficially prepare and/or condition the spent organic compost material for subsequent extraction steps. The organic acids present in the spent organic compost material may be affected by the heating 506 process in such a way as to facilitate their solubility in water. For example, the heating 506 may generally increase the overall polarity of the humic acid and fulvic acid contained within the spent organic compost material, which would promote the solubility of the molecules.

The final two steps in the method, combining 508 the organic compost material with water and extracting 510 an aqueous liquid comprising humic acid and fulvic acid, are described in substantial detail above with reference to FIGS. 1-4.

While the effluent resulting from any of the processes described herein may be the final product and ready for use, other optional processes may be carried out to prepare the resulting product for specific uses. For example, the effluent may be dried to create a dry powder. Any process known to those of skill in the art can be employed to effectuate this drying process. Other components and additives may also be added to the product, depending on the desired composition and use of the product. Examples include, but are not limited to, fertilizer components, urea, and potassium. Such additives, in combination with the fulvic acid and humic acid, provide valuable benefits and advantages for plant growth and nutrition.

The effluent from the above-described systems and methods results in a novel product that contains a high concentration of humic substances, particularly fulvic acid, and beneficial plant nutrients. Generally, the composition of the final product includes fulvic acid, which in one embodiment comprises at least 4% of the total product by weight, and in one aspect comprises approximately 4% to 10%, and in another aspect comprises at least 7%, and in another aspect comprises approximately 7% to 10%. The product also comprises humic acid up to approximately 3% of the total product by weight, and in another aspect comprises humic acid at approximately 0.5% to approximately 2.5% by weight of the total product.

The novel product also contains a large amount of necessary plant nutrients, including both macronutrients and micronutrients. For example, the novel product contains appreciable quantities of phosphorous, potassium, calcium, magnesium, sulfur, boron, copper, iron, chlorine, manganese, molybdenum, and zinc. The product also has little to no heavy metals because the product is not produced from lignite or mineral ores. Standard methods for production of humic substances, including fulvic acid, from lignite, coal, and mineral sources result in a product that contains higher levels of heavy metals, such as lead and cadmium, because the acids used in these processes do not strip the humic substances of heavy metals. However, the novel fulvic acid product described herein contains very little heavy metals because the source material for the product contains very few heavy metals. For example, the product generally contains less than approximately 0.1 ppm of cadmium, and specifically less than approximately 0.061 ppm, and more specifically less than approximately 0.020 ppm. The product also contains less than approximately 0.1 ppm of lead, and specifically less than 0.060 ppm, and more specifically less than 0.055 ppm.

The systems, methods, and products described herein can be better understood with a description of the following examples. It should be noted, however, that the following examples are to serve only as illustrative examples and should in no way provide limitations to the systems, methods, and products described herein.

Example 1

An exemplary fulvic acid solution was prepared as follows. Water was combined with an organic compost mixture in the form and formulation of compost windrows formulated for mushroom growth. The compost windrows contained rye straw (85-90% by weight), chicken manure, peat, gypsum, and shaft from alfalfa seeds. Water was added to the exterior surface of compost windrows in amounts that exceeded the saturation level of the compost windrows. The excess water effluent that escaped out of the organic compost mixture windrows was collected in defined channels at the bases of the windrows. This water effluent was then passed through a 50 micron filter, and then treated to kill harmful pathogens by adding copper sulfate to the effluent. The resulting concentration of fulvic acid and humic acid, micronutrients, and macronutrients in the product was as shown in Table 1 below. The concentration of fulvic acid and humic acid were measured by spectrophotometric analysis.

TABLE 1

| Component | Concentration (ppm) |
|---|---|
| Fulvic Acid* | 9.25% |
| Humic Acid* | 0.77% |
| Phosphorous | 89.70 |
| Potassium | 7,290.00 |
| Calcium | 274.00 |
| Magnesium | 129.00 |
| Sulfur | 739.00 |
| Boron | 1.54 |
| Copper | 0.46 |
| Iron | 5.66 |
| Chlorine | 428.00 |
| Manganese | 0.76 |
| Molybdenum | 0.21 |
| Zinc | 1.89 |

*Concentration measured as % by weight

Example 2

An exemplary fulvic acid solution was prepared as follows. Water was combined with an organic compost mixture in the form and formulation of organic compost material designed and used as a bed for mushroom growth. The organic compost material was generated from organic matter comprising rye straw (85-90% by weight), chicken manure, peat, gypsum, and shaft from alfalfa seeds. The organic compost material was used approximately 1-day after mushrooms growing on the bed were harvested. Water was mixed with the organic compost material to create a slurry. The slurry then passed through a centrifuge separator to separate the slurry's solid components from its liquid component. The resulting concentration of fulvic acid and humic acid in the liquid product was as shown in Table 2 below. The concentration of fulvic acid and humic acid were measured by spectrophotometric analysis.

TABLE 2

| Component | Concentration (% by weight) |
|---|---|
| Fulvic Acid | 7.19% |
| Humic Acid | 2.28% |

Example 3

An exemplary fulvic acid solution was prepared as follows. Water was combined with an organic compost mixture in the form and formulation of organic compost material designed and used as a bed for mushroom growth. The organic compost material was generated from organic compost mixture containing rye straw (85-90% by weight), chicken manure, peat, gypsum, and shaft from alfalfa seeds. The organic compost material was used approximately 14-days after mushrooms growing on the bed were harvested. Water was mixed with the organic compost material to create a slurry. The slurry then passed through a centrifuge separator to separate the slurry's solid components from its liquid component. The resulting concentration of fulvic acid and humic acid in the liquid product was as shown in Table 3 below. The concentration of fulvic acid and humic acid were measured by spectrophotometric analysis.

TABLE 3

| Component | Concentration (% by weight) |
|---|---|
| Fulvic Acid | 8.71% |
| Humic Acid | 0.92% |

Example 4

An exemplary fulvic acid solution was prepared as follows. Water was combined with an organic compost mixture in the form and formulation of organic compost material designed and used as a bed for mushroom growth. The organic compost material was generated from organic compost mixture containing rye straw (85-90% by weight), chicken manure, peat, gypsum, and shaft from alfalfa seeds. The organic compost material was used approximately 10-weeks after mushrooms growing on the bed were harvested. Water was mixed with the organic compost material to create a slurry. The slurry then passed through a belt press separator to separate the slurry's solid components from its liquid component. The resulting composition of the product was as shown in Table 4 below. The concentration of fulvic acid and humic acid were measured by spectrophotometric analysis.

TABLE 4

| Component | Concentration (ppm) |
|---|---|
| Fulvic Acid* | 9.06% |
| Humic Acid* | 0.51% |
| Phosphorous | 60.80 |
| Potassium | 18,900.00 |
| Calcium | 1,690.00 |
| Magnesium | 407.00 |
| Sulfur | 4,720.00 |
| Boron | 1.03 |
| Copper | 0.12 |
| Iron | 5.28 |
| Manganese | 1.18 |
| Molybdenum | 0.15 |
| Zinc | 0.39 |

Example 5

An exemplary fulvic acid solution was prepared as follows. Water was combined with an organic compost mixture in the form and formulation of organic compost material designed and used as a bed for mushroom growth. The organic compost material was generated from organic compost mixture containing rye straw (85-90% by weight), chicken manure, peat, gypsum, and shaft from alfalfa seeds. Water was mixed with the organic compost material to create a slurry. The slurry then passed through a centrifuge separator to separate the slurry's solid components from its liquid component. The resulting concentration of fulvic acid in the liquid product was approximately 4% by weight. This liquid product was then reused by combining it with another similar organic compost mixture, which was then run through the centrifuge. The concentration of fulvic acid in the liquid product after the second separation in the centrifuge was approximately 7.6% by weight.

The product produced according to the systems and methods described herein can be used for many different purposes, including agriculture, farming, gardening, and horticulture. Examples of these uses include, but are not limited to, lawns, flower and vegetable gardens, trees, vines, ornamentals, landscaping, parks, golf greens, parks, and newly laid top soils and/or turf, sports fields, fruit trees, and the like. In these applications, the product stimulates plant growth, revitalizes distressed plants, increases mineral and nutrient uptake, and improves roots.

The product can also be used as a pesticide to repel pests and insects. The inventors have observed that distressed plants and plants in poor nutrition attract pests and insects, which further damage the plants and consume much needed nutrients. For example, bark beetles often attack trees that are already weakened by disease, drought, smog, other beetles, or physical damage. The inventors have discovered that by applying the product to the plant environment of distressed plants, the plants become healthy again, thereby repelling pests and insects. Healthy trees may put up defenses by producing resin or latex, which may contain a number of insecticidal and fungicidal compounds that can kill or injure attacking insects, or simply immobilize and suffocate them with the sticky fluid. These results can be achieved with any type of distressed plant to repel almost any type of insect. In one particular embodiment, the product can be applied to pine trees and other coniferous trees to eradicate the bark beetle and other insects and pests.

In another embodiment the product is used as an additive in other beneficial chemicals, substances, and compounds, including, but not limited to, fertilizers, soil amendments, herbicides, nutrients, pesticides, insecticides, fungicides, and defoliants. In another embodiment, the product is used as an additive in microbial mixtures used for composting.

In one embodiment, the product is used by applying it to a plant environment, which includes a plant and all of its parts, such as roots, stems, leaves, and fruit, the soil and air from which the plant draws water and nutrients. The product may be applied to the plant environment in many different forms. For example, in one embodiment the product as produced by the foregoing novel systems and methods is applied to the plant environment directly without modification. In another embodiment, the product is applied to the plant environment as an amendment with fertilizer. The product may be applied to the plant environment either in dry form, such as in a powder or bricks, or in liquid solution form. In another embodiment, the product is applied to the plant environment as a component of another beneficial chemical, substance, or compound, as mentioned above.

The product may be applied to the plant environment by many different means, including, but not limited to, spraying, irrigation, fertigation, flood irrigation, drip irrigation, sprinkler irrigation, and the like. In one embodiment, the product is applied directly to plants as a foliar spray. In another embodiment, the product may be applied to the plant environment in solid form by spreading, burying the product in the soil, or placing the product in or on the soil.

The above-described novel systems and methods have several benefits and advantages over current systems and methods for separating and producing humic substances and fulvic acid. Organic compost material and organic matter, unlike the traditional sources for humic substances and fulvic acid (i.e. coal, lignite, and other mineral ores), is not finite. Rather, organic compost material and organic matter are essentially renewable resources, based on the carbon life cycle. There is little risk of depleting these sources of humic substances.

Additionally, the novel process is generally much faster than current technology for separating and producing humic substances, which require hard rock mining and separation of humic substances from lignite, coal, and hardrock mineral ores. Thus, the novel process also avoids the harmful effects of the mining process on the environment. It is also much cheaper to operate and produce fulvic acid and humic substances from organic matter and organic compost material than from tradition hardrock sources. Another advantage of this process is that it can handle a much wider range of materials, virtually working with any type of organic matter or organic compost material. This process also does not require the use or generation of new decomposition microbes or microorganisms to produce the necessary organic compost material. Rather, the process relies on the use of existing methods and technologies for generating suitable organic compost material. The novel process described herein does not require the use of acids or bases to leach out the humic substances. Additionally, this process allows for commercial and large-scale production because organic matter and organic compost material are available in large, commercial quantities for use in the novel systems and processes described herein. Finally, the novel systems and processes virtually eliminate all heavy metals from the final product. Existing extraction technology is not able to satisfactorily remove all heavy metals from the humic substances. Thus, the final product contains a beneficial mixture of humic substances, particularly fulvic acid, without heavy metals or the need to remove heavy metals.

The preceding description has been presented only to illustrate and describe exemplary embodiments of the present system and methods of producing humic substances and fulvic acid, and the resulting fulvic acid product and its uses. It is not intended to be exhaustive or to limit the system, methods, and products to any precise form or embodiment disclosed. Many modifications and variations are possible in light of the above teaching. It is intended that the scope of the products and processes be defined by the following claims.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for producing an aqueous solution of fulvic acid and humic acid comprising:
   providing an organic compost material;
   combining the organic compost material with a crop;
   after combining the organic compost material with a crop, heating the organic compost material;

after heating the organic compost material, combining the organic compost material with water; and after combining the organic compost material with water, extracting an aqueous liquid, wherein the aqueous liquid comprises humic acid and fulvic acid.

2. The method of claim 1, wherein the organic compost material comprises straw and manure.

3. The method of claim 2, wherein providing the organic compost material comprises aerobically composting the straw and manure for a period of three weeks.

4. The method of claim 1, wherein the crop comprises mushroom spores and mycelia.

5. The method of claim 1, wherein heating comprises heating the organic compost material to at least 170° F.

6. The method of claim 1, wherein heating comprises heating the organic compost material to at least 200° F.

7. The method of claim 1, wherein heating comprises heating the organic compost material to at least 220° F.

8. The method of claim 1, wherein combining the organic compost material with water comprises forming windrows of the organic compost material and spraying water over the windrows.

9. The method of claim 8, wherein extracting an aqueous liquid comprises collecting liquid run-off from the windrows.

10. The method of claim 1, wherein combining the organic compost material with water comprises mixing water with organic compost material in a ratio of up to 1:1 by weight.

11. The method of claim 1, wherein the water comprises non-treated neutral water.

12. The method of claim 1, wherein extracting an aqueous liquid comprises filtering the mixture of water and the organic compost material and collecting the filtrate.

13. The method of claim 1, further comprising processing the aqueous liquid after extracting the aqueous liquid.

14. The method of claim 13, wherein processing comprises concentrating the humic acid and fulvic acid in the aqueous solution.

15. The method of claim 13, wherein processing comprises mixing essential oil with the aqueous liquid for odor control.

16. A method for producing an aqueous solution of fulvic acid and humic acid comprising:

providing an organic compost material of wheat straw and chicken manure;

combining the organic compost material with mushroom spores and mycelia;

after combining the organic compost material with mushroom spores and mycelia, heating the organic compost material to higher than 200° F.;

after heating the organic compost material, combining the organic compost material with non-treated neutral water;

after combining the organic compost material with water, extracting an aqueous liquid, wherein the aqueous liquid comprises humic acid and fulvic acid; and after extracting the aqueous liquid, mixing essential oil with the aqueous liquid for odor control.

17. The method of claim 16, wherein combining the organic compost material with non-treated neutral water comprises forming windrows of the organic compost material and spraying non-treated neutral water over the windrows.

18. The method of claim 17, wherein extracting an aqueous liquid comprises collecting liquid that percolates through or runs off the windrows.

19. The method of claim 16, wherein combining the organic compost material with non-treated neutral water comprises mixing non-treated neutral water with organic compost material in a ratio of up to 1:1 by weight.

* * * * *